United States Patent [19]

Baer et al.

[11] Patent Number: 5,038,607

[45] Date of Patent: Aug. 13, 1991

[54] WIND SPEED AND WIND DIRECTION SIGNAL GENERATOR

[75] Inventors: John S. Baer, Bar Harbor; Michael A. Vietti, Swan's Island, both of Me.

[73] Assignee: RainWise, Inc., Bar Harbor, Me.

[21] Appl. No.: 461,044

[22] Filed: Jan. 4, 1990

[51] Int. Cl.$^5$ ............................ G01W 1/02; G01P 5/07
[52] U.S. Cl. .................................... 73/189; 73/861.78; 73/861.85
[58] Field of Search ...................... 73/188, 189, 861.78, 73/861.85; 324/165, 174; 340/601, 672, 949; 364/420

[56] References Cited

U.S. PATENT DOCUMENTS

| | | |
|---|---|---|
| 2,579,344 | 12/1951 | Sias . |
| 2,598,505 | 5/1952 | Carmody . |
| 3,162,042 | 12/1964 | Hart ............................ 73/861.78 X |
| 3,373,606 | 3/1968 | Guidi . |
| 3,731,533 | 5/1973 | Geery ............................ 73/861.78 |
| 4,031,755 | 6/1977 | Ravussin ............................ 73/189 |
| 4,152,934 | 5/1979 | Weller et al. . |
| 4,548,074 | 10/1985 | Krueter . |

FOREIGN PATENT DOCUMENTS 1238041 7/1971 United Kingdom .................. 73/189

Primary Examiner—Charles A. Ruehl
Attorney, Agent, or Firm—Daniel H. Kane

[57] ABSTRACT

A wind speed and wind direction signal generator includes first and second pulse signal generators each with a respective stator and rotor. The stator for each pulse generator has at least two stator coils mounted at a radial angle relative to each other in the direction of rotation of a rotor so that pulse signals excited on the stationary output lines of the two stator coils are phase shifted relative to each other at a phase detectable angle. The rotor has at least one permanent magnet with two poles spaced from each other for rotation relative to the respective stator coils and for exciting the pulse signals on the stator coil stationary output lines. First and second wind propellers are secured to the respective rotors and are oriented to compass directions at approximately 90° defining a quadrant of a compass coordinate system. The wind propellers cause rotation of the respective rotors at respective frequencies proportional to first and second wind speed components. Phase detectors detect the direction of phase shift of pulse signals from each pair of stator coils from the first and second pulse signal generators. Counters count the pulses from the respective signals over predetermined time intervals generating wind speed component magnitude signals. A microprocessor and program elements compute the desired wind speed and wind direction information from the wind speed component magnitude signals, wind direction angle signals, quadrant signals, calibration factor signals, and trigonometric function signals.

39 Claims, 9 Drawing Sheets 5,038,607

WIND SPEED AND WIND DIRECTION SIGNAL GENERATOR

TECHNICAL FIELD

This invention relates to a new wind speed and wind direction signal generator for developing and monitoring desired wind speed and wind direction information. The invention is useful as a single purpose unit for generating, storing, updating and displaying wind speed and wind direction information or is applicable for use as part of a weather station monitoring multiple weather parameters.

BACKGROUND ART

U.S. Pat. No. 4,287,762 describes a digital electronic weather station, weather center, or weather monitor with a digital display panel and circuitry for selecting and displaying on the panel any of a number of monitored weather functions. The weather parameters include, for example, temperature, barometric pressure, humidity, wind speed, wind direction, and rain fall. Calculated weather parameters such as wind chill and degree days may also be included. The weather parameters are monitored by various ambient condition sensing transducers coupled to the weather station circuitry. These transducers provide measurement values in the form of electrical analog or digital signals for further processing. The weather parameter measurement signals are processed and stored and weather data is then displayed in the form of characters on the weather station panel. The weather station panel may be located for example on a wall, desk, or other accessible location.

In the basic weather station described in U.S. Pat. No. 4,287,762 a memory and microprocessor permits selection and display from memory of maximum and minimum readings of the monitored weather parameters and selection of any additional calculated functions. A system clock permits display of time and date. User selection of weather parameters for display of measurement value weather data is made from among the multiple weather parameter functions by, for example, a rotary switch. A rotary dial with detente positions is used for selecting a particular transducer and associated circuitry and display elements. Conventional push button switches may also be used for selecting functions for display. Maximum and minimum measurement values of a particular weather parameter may also be selected for display along with the time and date of occurrence of the maximum or minimum value. Additional switches are provided for resetting data for storage and display.

A video display system for the weather station of U.S. Pat. No. 4,287,762 is described in U.S. patent application No. 268,802 filed Nov. 7, 1988 for a weather station display system which displays the weather data on a video monitor, TV receiver, or other raster screen display. The weather data is derived from the weather station having multiple weather parameter sensors or transducers, and the electrical signals representative of the measured values of weather parameters are conditioned and converted to digitally coded weather data. A microprocessor periodically samples and stores the digitally coded weather data and transfers weather data to a screen memory for raster scanning onto a raster screen display. A light pen coupled to the raster controller permits interrogation of character locations for selectively displaying and modifying weather data.

OBJECTS OF THE INVENTION

It is an object of the present invention to provide a new wind speed and wind direction signal generator useful for generating desired wind speed and wind direction information.

Another object of the invention is to provide a new wind speed and wind direction signal generator useful as part of an independent wind parameter monitoring unit or which may be incorporated into the weather station of U.S. Pat. No. 4,287,762 or other similar weather stations and related improvements for example described in U.S. patent application Ser. No. 268,802 filed Nov. 7, 1988.

A further object of the invention is to provide a new wind speed and wind direction signal generator which minimizes moving parts and simplifies the hardware and software for generating and processing accurate wind parameter data.

DISCLOSURE OF THE INVENTION

In order to accomplish these results the invention provides a first signal generator with a wind propeller oriented at a first compass angle for generating a first wind speed component magnitude signal in response to the wind. The signal is generated with a signal parameter substantially proportional to the magnitude of a first wind speed component at the first compass angle. A second signal generator with a second wind propeller oriented in a second compass direction provides a second wind speed component magnitude signal. This second signal is generated with a similar signal parameter substantially proportional to the magnitude of a second wind speed component at the second compass angle. The first and second compass angles are approximately 90° with respect to each other defining a quadrant of a compass coordinate system.

To identify the quadrant of origin of the wind, rotation direction detectors determine the direction of rotation of the first and second wind propellers and generate respective first and second rotation direction signals. A microprocessor receives the first and second wind speed component magnitude signals and first and second rotation direction signals. Associated programming implements novel processing of the data as hereafter described.

In the preferred example embodiment, the invention provides a first pulse signal generator for generating in response to the wind a first pulse signal having a pulse frequency substantially proportional to the magnitude of the first wind speed component at the first compass angle. A second pulse generator generates in response to the wind a second pulse signal having a pulse frequency substantially proportional to the magnitude of the second wind speed component at the second compass angle approximately 90° from the first compass angle.

According to the invention a first counter is operatively coupled to the first pulse signal generator for counting pulses of the first pulse signal through a defined time interval. The resulting count provides the first wind speed component magnitude signal. A second counter is operatively coupled to the second pulse signal generator for counting pulses of the second pulse signal through the defined time interval. The second count provides the second wind speed component magnitude signal.

The system embodiment of the invention incorporates a microprocessor or other computer processor operatively coupled to the first and second counters. The program software associated with the computer processor includes coded instructions for determining the wind direction angle within the quadrant using the first and second wind speed component magnitude signals and generating a wind direction angle signal. The coded instructions also include steps for determining the magnitude of the wind speed at said wind direction angle using the wind direction angle signal and one of the wind speed component magnitude signals. The desired wind speed information can then be stored, updated and displayed.

The first and second pulse signal generators are constructed and arranged so that the respective first and second pulse signals are actually complex signals or signal complexes each including a pair of pulse signals. The pulse signals of each pair of pulse signals are phase shifted relative to each other with the relative direction of the phase shift determined by the direction of the respective wind speed component.

According to the system embodiment of the invention a first phase detector is coupled to the first pulse signal generator for detecting the relative direction of phase shift of the first pair of pulse signals of the first pulse signal complex. The first phase detector provides the first rotational direction detector, and generates a first phase shift direction signal which constitutes the first rotation direction signal. A second phase detector is coupled to the second pulse signal generator for detecting the relative direction of phase shift of the second pair of pulse signals forming the second pulse signal complex. The second phase detector provides the second rotation direction detector, and generates a second phase shift direction signal which forms the second rotation direction signal.

The microprocessor or other computer processor is operatively coupled to the first and second phase detectors. The program software includes coded instructions for determining from the phase shift direction signals the quadrant of the compass coordinate system which coincides with the wind direction at the computed wind direction angle of the quadrant. The computer processor generates a quadrant signal, and the desired wind direction information is derived from the quadrant signal and the wind direction angle signal. The desired wind direction information can then be stored, updated and displayed.

According to the invention this wind speed and wind direction signal generator may be incorporated in a larger weather station such as that described in U.S. Pat. No. 4,287,762 using the microprocessor of the weather station as the system computer processor. The program software according to the invention associated with the computer processor is therefore also incorporated into the weather station for example in the form of ROM's and EPROM's. The invention contemplates that maximum wind speed parameter weather data may be stored for recall and display along with the wind direction and time and date of occurrence while the system provides the continuing monitoring, storing, updating and display of current wind parameter data.

Further refinements of the preferred system embodiment include the use of exclusive OR gates operatively coupled between the first and second pulse signal generators and the respective first and second counters. The exclusive OR gates multiplex and count the pulses from both pulse signals of the pair of pulse signals from the respective first and second pulse signal generators for improving resolution of the respective wind speed component magnitude signals. Operational amplifiers are coupled between the respective first and second pulse signal generators and the respective first and second phase detectors and exclusive OR gates for squaring the pulses of the respective pairs of pulse signals to facilitate phase detection and counting.

The program software incorporates coded instructions for determining the wind direction angle within the starting quadrant by unique steps. These steps include predicting magnitudes of one of the wind speed components from the counted magnitude of the other wind speed component. This is accomplished by providing tangent or cotangent trigonometric ratio signals for successive angles within the quadrant, using the other wind speed magnitude signal and said tangent or cotangent trigonometric ratio signals, and generating corresponding predicted magnitude signals for the one wind speed component for successive angles within the quadrant. The steps further include comparing the predicted magnitudes at the successive angles for the one wind speed component with the counted magnitude for the same wind speed component using the corresponding predicted magnitude signals and wind speed component magnitude signal. By these comparisons the approximate wind direction angle within the quadrant is ascertained for generating the wind direction angle signal.

The program instructions for determining the magnitude of the wind speed at the ascertained wind direction angle include the steps of providing a secant or cosecant trigonometric ratio signal in response to the wind direction angle signal for the respective wind direction angle, calibrating one of the wind speed component magnitude signals according to the operating characteristics of the pulse signal generator, and multiplying the calibrated wind speed component magnitude signal with the secant or cosecant trigonometric ratio signal at the wind direction angle, for generating the wind speed magnitude signal and desired wind speed information.

Finally the program data includes instructions for generating or accessing calibration factor signals characteristic of the method and apparatus for generating the respective first and second pulse signal complexes, and adjusting the wind speed magnitude signal using the calibration factor signals for providing the calibrated wind speed component magnitude signal.

In the preferred embodiment, the invention also provides a new wind speed and wind direction signal generator hardware configuration. Each of the signal generators includes a stator having at least two stator coils providing respective first and second stationary output lines for delivering the pair of pulse signals from the pulse signal generator on the stationary output lines. The stator coils are mounted on the stator at an angle relative to each other in the direction of rotation of a rotor so that the pulse signals of the pair are phase shifted relative to each other at a phase detectable angle.

Each pulse signal generator also incorporates a rotor having at least one permanent magnet providing at least two poles spaced from each other and mounted on the rotor for rotation relative to the respective stator coils for exciting pulse signals on the stationary output lines of the stator coils upon rotation of the rotor. The invention of course contemplates that the pulse signal generator stator may incorporate additional stator coils, and the pulse signal generator rotor may incorporate additional permanent magnets or additional poles to increase the pulse frequency of the pair of pulse signals on the stationary output lines for increasing resolution of the wind speed component magnitude measurements or counts.

A wind propeller is mounted on and secured to the rotor for causing rotation of the respective rotor in response to wind. The propeller of one of the first and second pulse signal generators is oriented for facing one of the first or second compass angles and rotates at a frequency substantially proportional to the magnitude of the wind speed component at the respective compass angle. The wind propeller of the other pulse signal generator is oriented to face the other of the first or second compass angles 90° apart. The selected compass angles define the quadrant of a compass coordinate system useful for ascertaining both wind speed and wind direction information.

According to an alternative embodiment not illustrated, the first and second signal generators are provided by conventional DC generators with brushes and commutators for generating first and second wind speed magnitude component signals. These first and second signals are DC level signals having DC voltage levels proportional respectively to the first and second wind speed components at the first and second compass angles of the quadrant. The DC generators may be DC motors with brushes and commutators operated as DC generators. Thus, the alternative embodiment provides DC voltage levels proportional to wind speed component magnitudes rather than pulse frequencies or counts proportional to wind speed component magnitudes.

The DC voltage level signals may be conditioned by appropriate conditioning circuitry for input to an analog to digital (A/D) converter which in turn provides inputs to the microprocessor. The A/D converter is set up to detect the sign or polarity of the respective first and second DC voltage level signals to determine the direction of rotation of the respective first and second wind props. In this respect, the A/D converter can also provide the rotation direction detectors and rotation direction signals. The A/D converter delivers first and second digital codes to the input of the microprocessor providing both the first and second wind speed component magnitude signals and the rotation direction signals. The A/D converter digitizer may use, for example, straight binary code or preferably "one's complement" code where the eighth bit of a byte indicates the sign or polarity of the DC voltage level signal whose magnitude is encoded in the other bits of the byte.

The microprocessor receives the first and second wind speed component magnitude signals and rotation direction signals of the alternative embodiment and processes them according to the novel program steps of the preferred embodiment. The disadvantage of the alternative embodiment in comparison with the preferred embodiment is that brushes and commutators are required for the DC generators with continuing maintenance of these moving parts.

A feature and advantage of both the preferred and alternative embodiments of the invention is that the wind propellers and signal generators in either instance form a "passive" system in the sense that an external power supply is not required. The wind propellers and signal generators generate their own power necessary for the wind speed component magnitude signals without separate power supplies. The signal generators stand ready to generate the desired signals in response to wind at any time without maintenance of batteries or power at remote locations etc.

The invention also contemplates an automated method for determining desired wind speed and wind direction information using the system hardware and software summarized above and as set forth in the following specification, drawings and claims.

BRIEF DESCRIPTION OF THE DRAWINGS

FIG. 4 is a simplified schematic circuit diagram of the electrical circuit coupling of the stator coils in the pulse signal generators of FIGS. 1-3, while

DESCRIPTION OF PREFERRED EMBODIMENTS AND BEST MODE OF THE INVENTION

Figure 1:
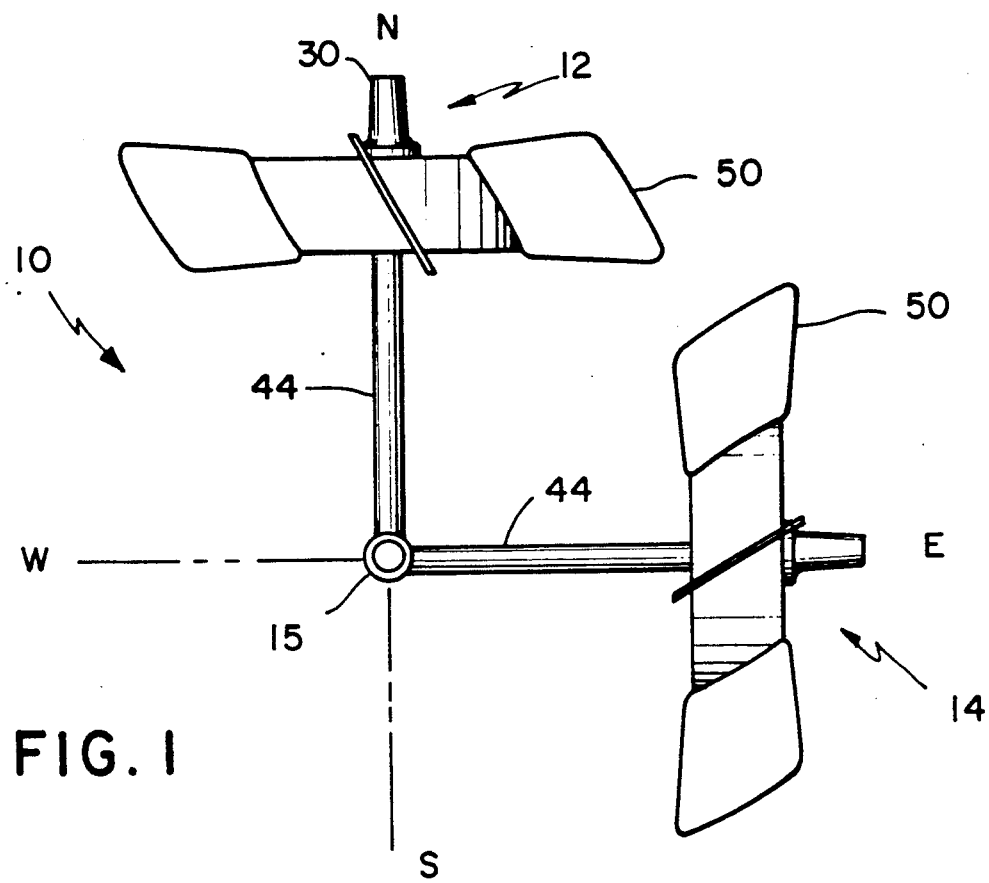
FIG. 1 is a simplified diagrammatic plan view from above of the wind speed and wind direction signal generator configuration according to the invention.
Figure 2:
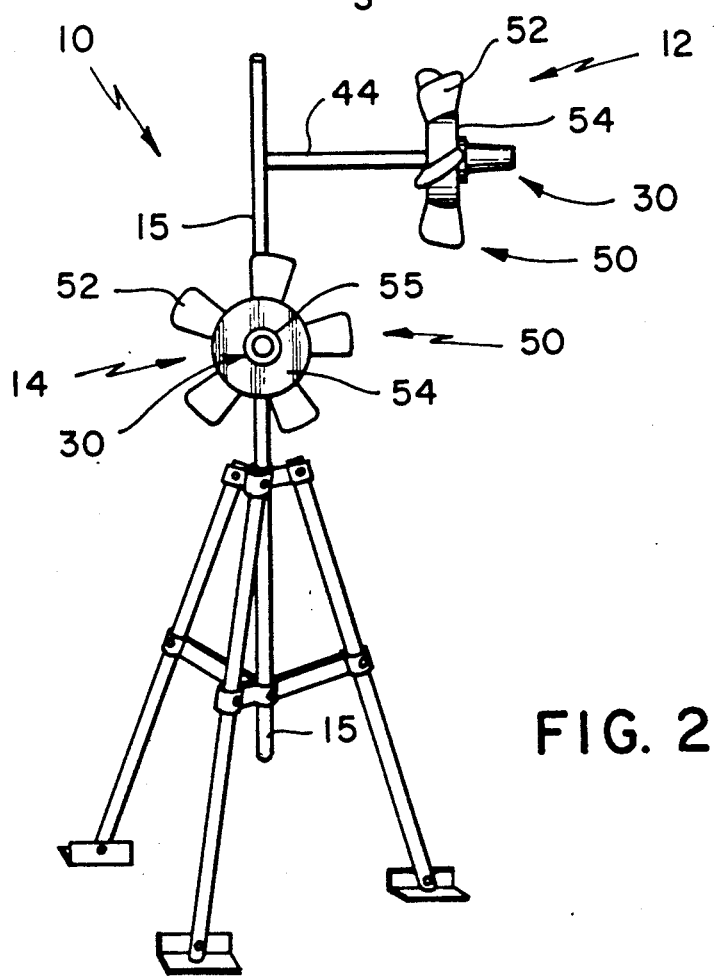
FIG. 2 is a partial side view of the signal generator configuration of FIG. 1 showing a mast mounting.
Figure 3:
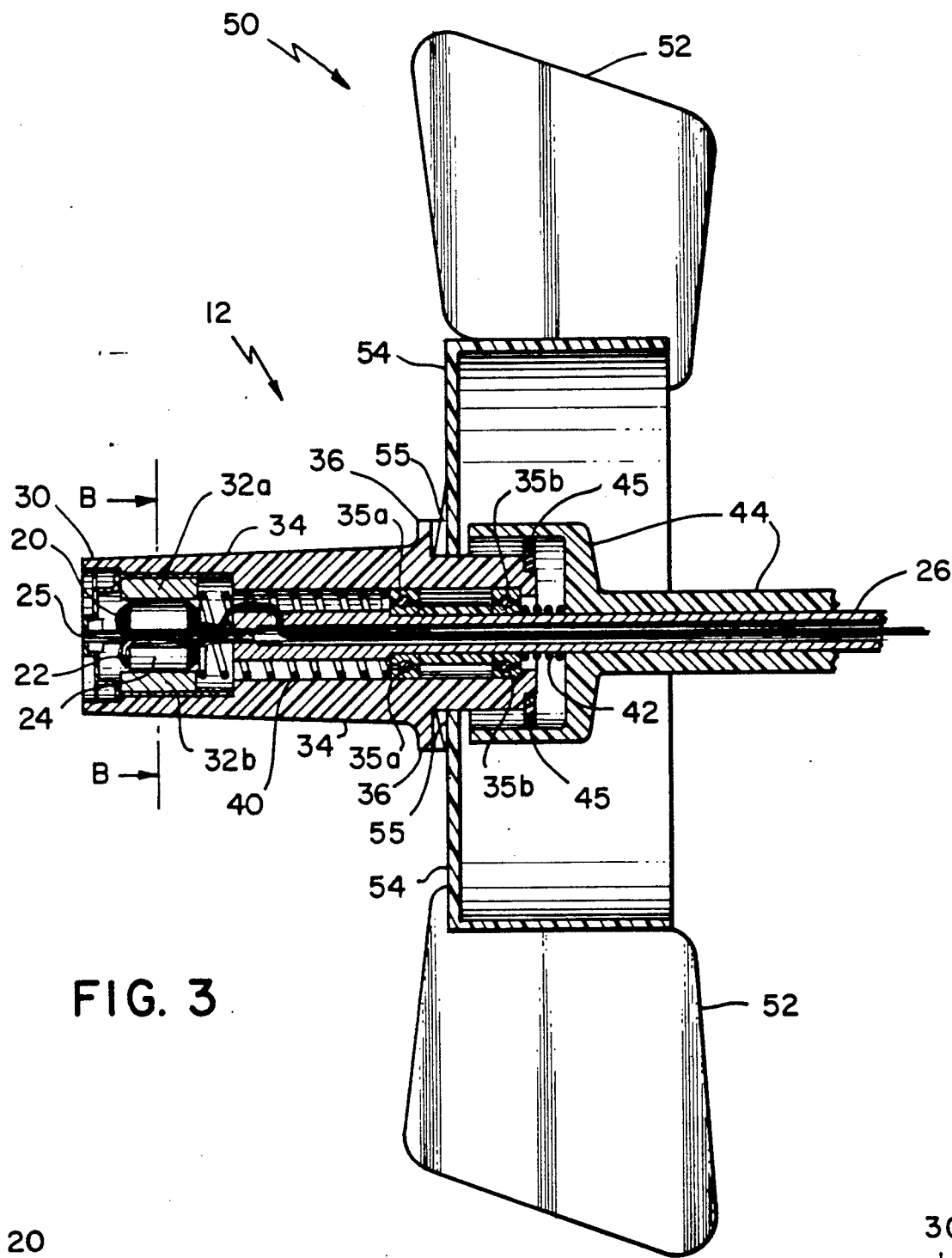
FIG. 3 is a side view in partial cross-section of a pulse signal generator and propeller for determining wind speed and wind direction according to the invention.

The basic wind speed and wind direction signal generator configuration 10 is illustrated in FIGS. 1-3. Two pulse signal generators 12 and 14 are mounted on a mast 15 and are oriented at approximately right angles with respect to each other encompassing and defining a quadrant of a compass coordinate system. In this example the pulse signal generators 12 and 14 are oriented with wind propellers facing respectively to the north (N) and east (E) representing the compass angles of 0° and 90°.

Figure 3A:
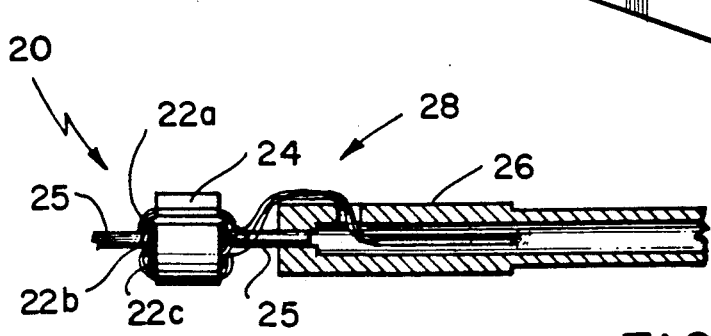
FIG. 3A is a detailed fragmentary side view in partial cross-section of the stator, stationary axle, and bearing surface for the pulse signal generator of FIG. 3.
Figure 3B:
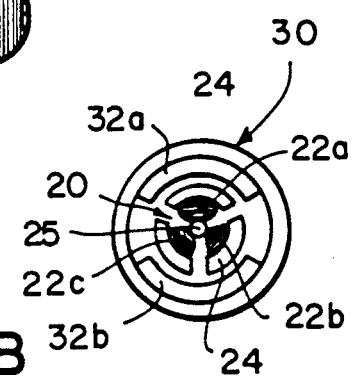
FIG. 3B is a fragmentary detailed front cross-sectional front view of the pulse signal generator in the direction of the arrows on Line B—B if FIG. 3.

As shown in FIGS. 3, 3A and 3B, each of the pulse signal generators 12 and 14 is composed of a stator 20 with three stator coils 22a, 22b and 22c wound on a three segment core 24 mounted on a support rod 25. The support rod 25 is press fitted and joined to a steel support tube 26 which forms a bearing surface for the rotor bearings as hereafter described.

Figure 4:
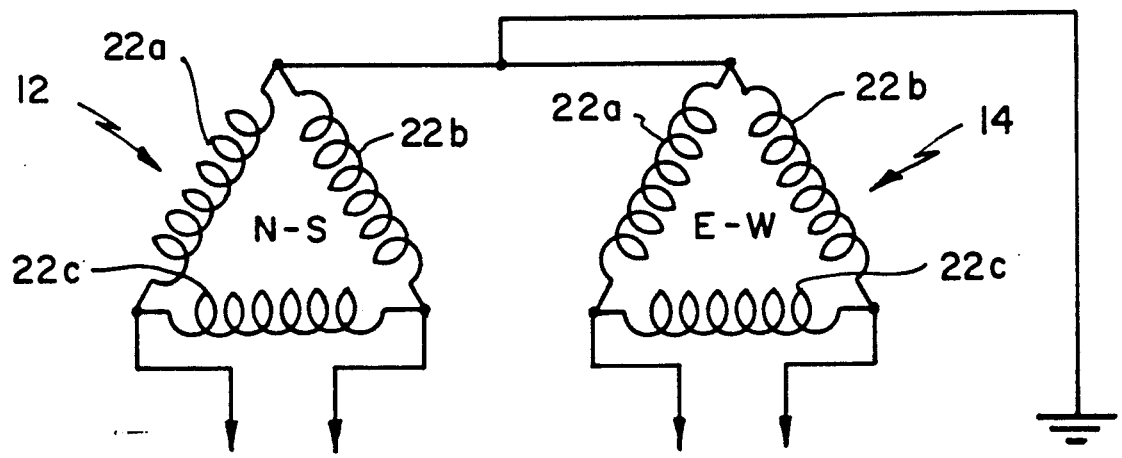

The three stator coils 22a, 22b and 22c for each of the pulse signal generators 12 and 14 are electrically coupled in a delta configuration as illustrated in FIG. 4. The three lead wires 28 from the stator coils 22 of each stator 20 as shown in FIG. 3A constitute the two pulse signal leads and the common ground lead of the delta configuration as shown in FIG. 4. The lead wires 28 from the stationary stator coils 22 enter the stationary support tube 26 through an opening and lead via the support tube and mast to the electronic circuitry hereafter described. An advantage of this stator configuration and arrangement of the invention is that all of the electrical signal lead circuitry is stationary and brushes and commutators are not required.

As shown in FIG. 3B the stator coils 22a, 22b and 22c are mounted on the stator 20 at phase detectable angles with respect to each other. That is, the stator coils 22a, 22b and 22c are spaced at radial angles with respect to each other in the direction of rotation of the rotor 30 which fits coaxially over the stator 20. The radial angle spacing of the stator coils permits excitation of pulse signals phase shifted relative to each other with the direction of phase shift determined by the direction of rotation of the rotor as hereafter described.

Referring to FIGS. 3 and 3B, the rotor 30 is fitted with permanent magnets 32a and 32b secured to the rotor housing 34. Each of the permanent magnets 32a and 32b is in the configuration of a fraction of a cylinder and is permanently magnetized in the radial direction so that the respective poles lie on the outside and inside of the cylindrical surface. The north magnetic pole of one of the permanent magnets 32a and 32b is oriented on the inside facing the stator coils while the south magnetic pole of the other permanent magnet is oriented on the inside facing the stator coils. The rotor housing 34 is mounted for rotation around the stator 20 by means of the bearings 35 which bear against the steel bearing surface of the support tube 26 of stator 20. The rotor 30 is supported at its outer end for rotation on the support rod 25 of the stator 20.

When the rotor 30 and rotor housing 34 are fitted over the stator 20, a pair of springs preload the bearings between the stator and rotor. The larger spring 40 is abutting between the rotating permanent magnets 32a and 32b and the rotating races of the bearings 35a. The large spring 40 therefore rotates with the rotor 30. The smaller spring 42 abuts between the stationary race of the bearings 35b and the stationary mast mounting hub 44 which is press fitted and bonded to the stator support tube 26 as shown in both FIG. 3 and FIG. 5. As shown in FIG. 3, the mast support hub which is stationary and secured to the stator 20 over the stator tube 26 includes a washer 45 which is seated adjacent to a terminating flange of the rotor 30 to keep out dust and particles.

The propeller 50 is a wind propeller or anemometer propeller with propeller blades 52 and a propeller hub 54. The propeller hub 54 is formed with radial keys 55 which fit within complementary slots in the flange 36 which is an integral part of the rotor housing 34. The propeller hub, 54 is thus press fitted, keyed and bonded to the rotor housing 34 for causing rotation of the rotor in response to wind.

Figure 3C:
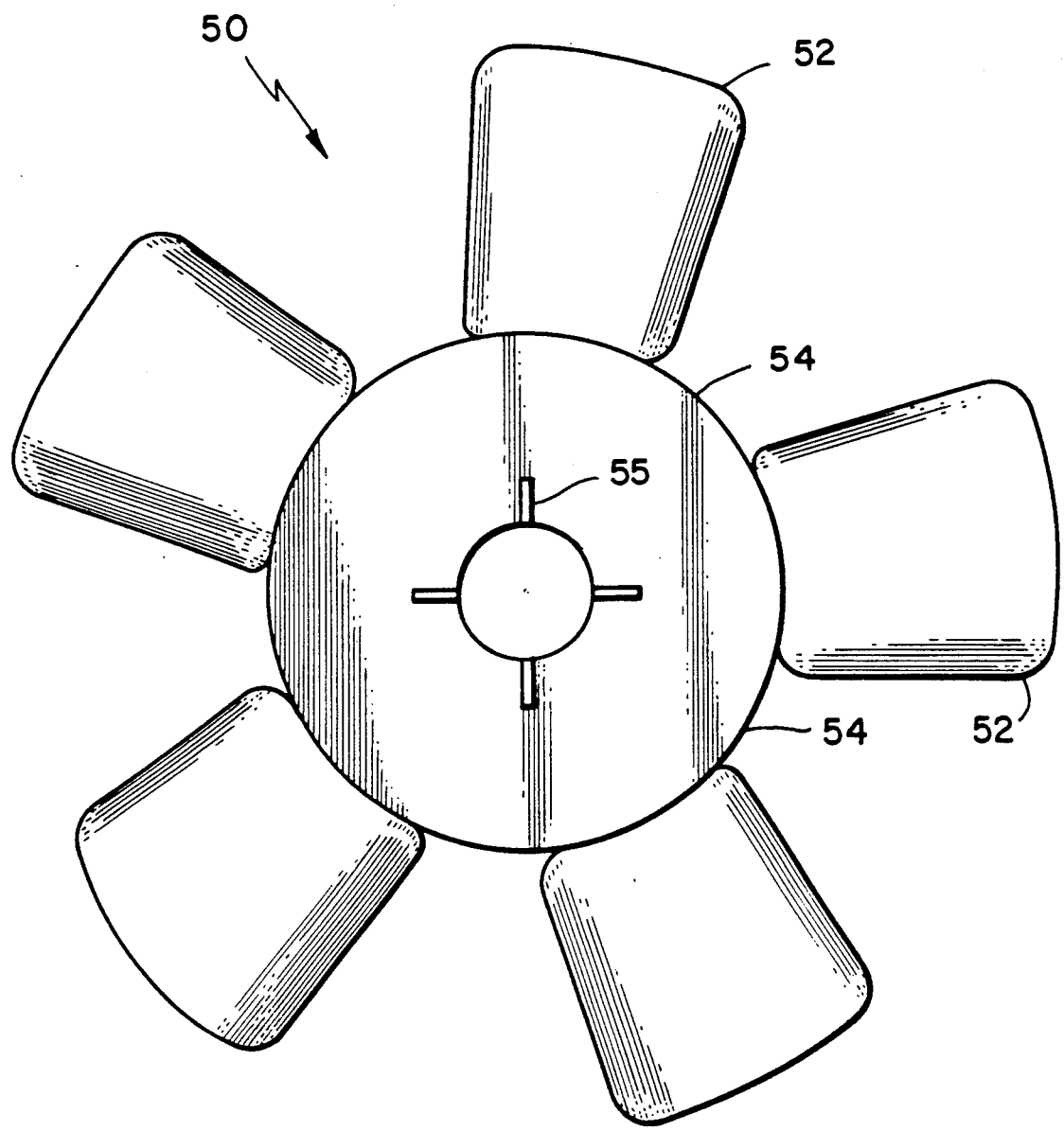
FIG. 3C is a plan view from the front of the propeller mounted on the pulse signal generator of FIG. 3.
Figure 3D:
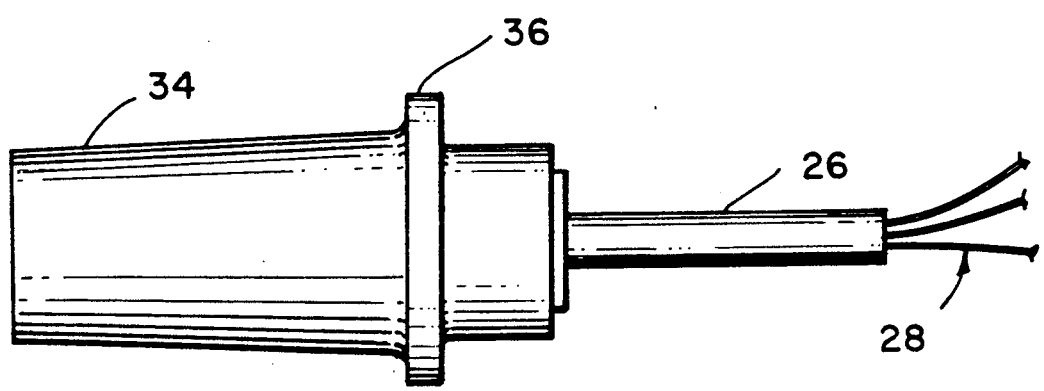
FIG. 3D is a fragmentary side elevation view showing to the left the rotor housing on which the propeller is mounted and which rotates with the rotor and to the right the stator tube or axle on which the stator and stator coils are mounted and which forms a bearing surface for the rotor bearings.
Figure 5:
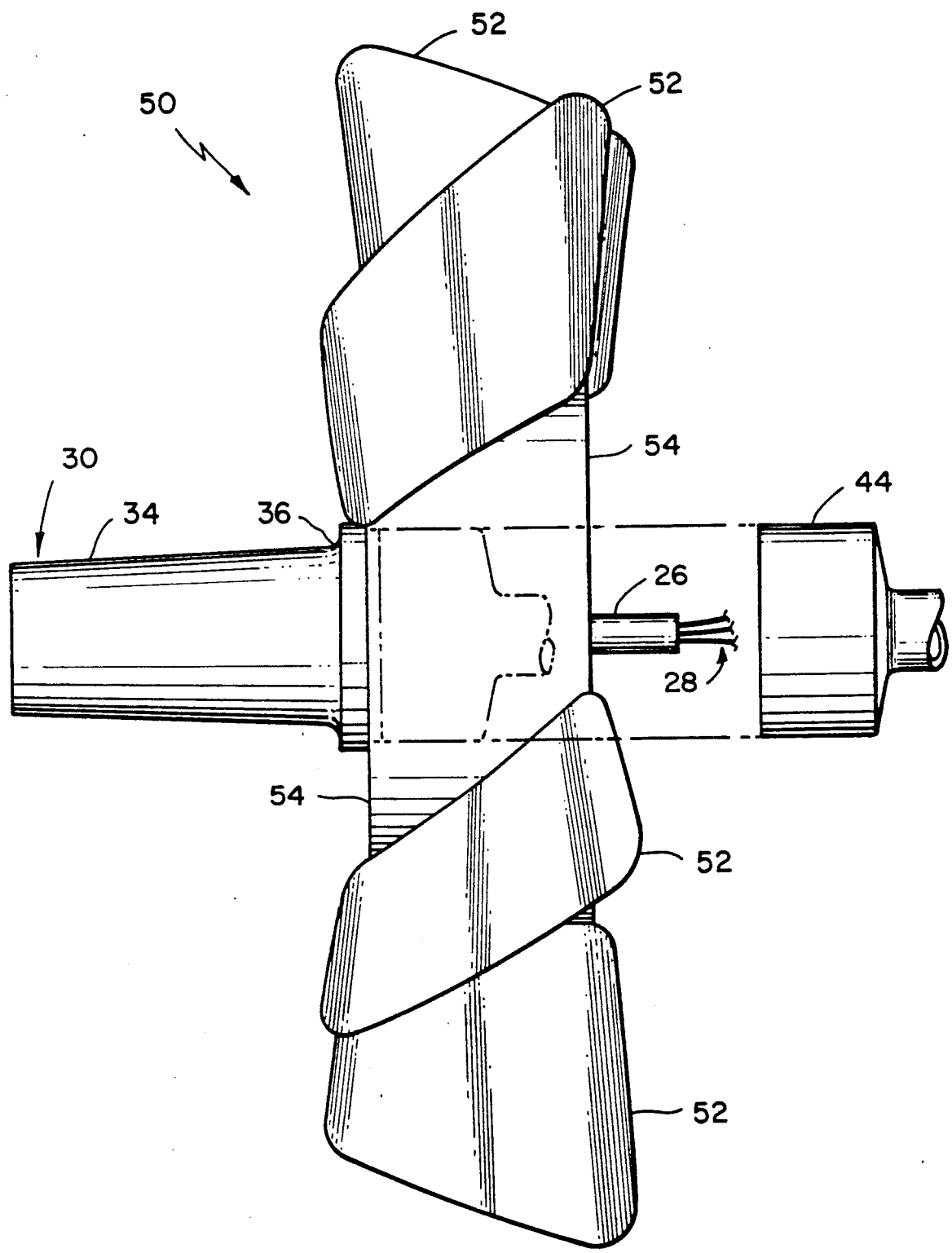
FIG. 5 is a side perspective view showing the propeller mounted on the pulse signal generator rotor housing with an exploded view of a mast mounting hub or cylinder.
Figure 6A:
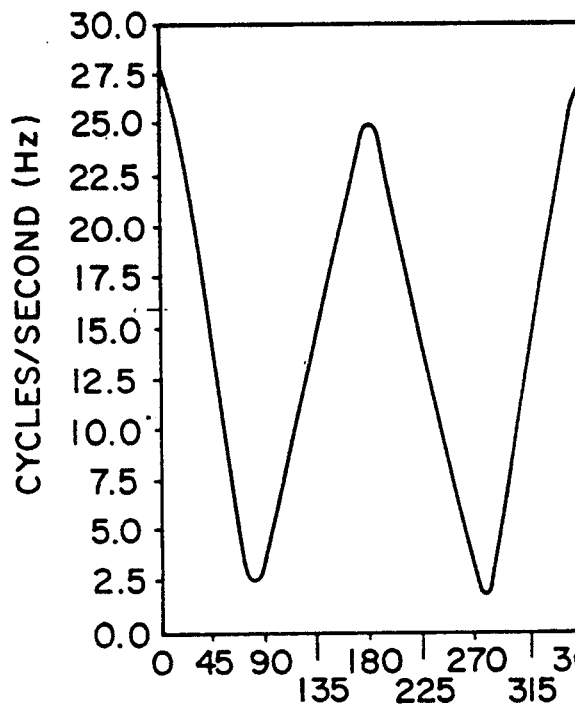
FIGS. 6A, 6B, 6C and 6D are simplified diagrammatic graphs empirically mapping the characteristics of the pulse signal generator rotor and propeller for the angle of the propeller relative to the wind direction versus the frequency of rotation of the propeller, which graphs are used for generating calibration information and the calibration factor signals for final computation of desired wind speed information.
Figure 6B:
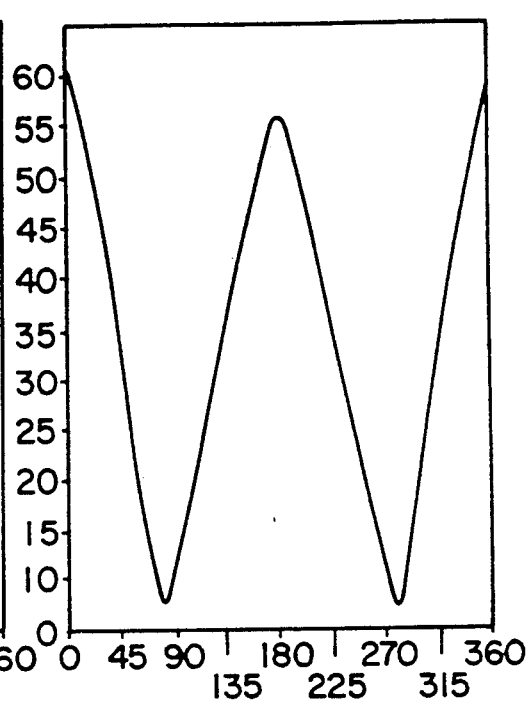
Figure 6C:
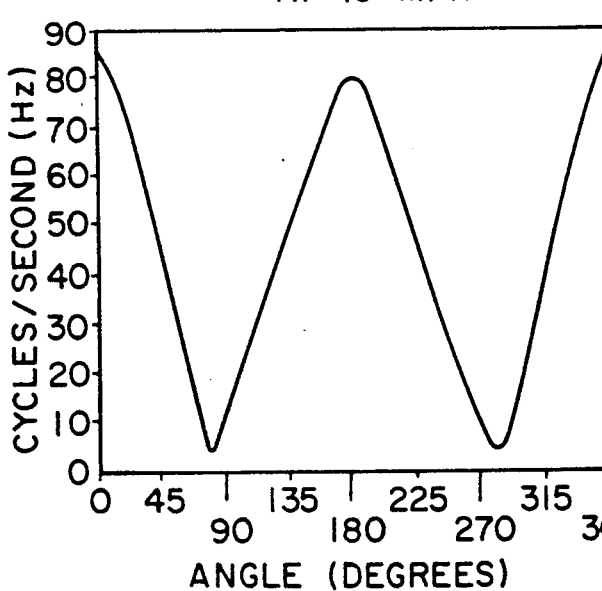
Figure 6D:
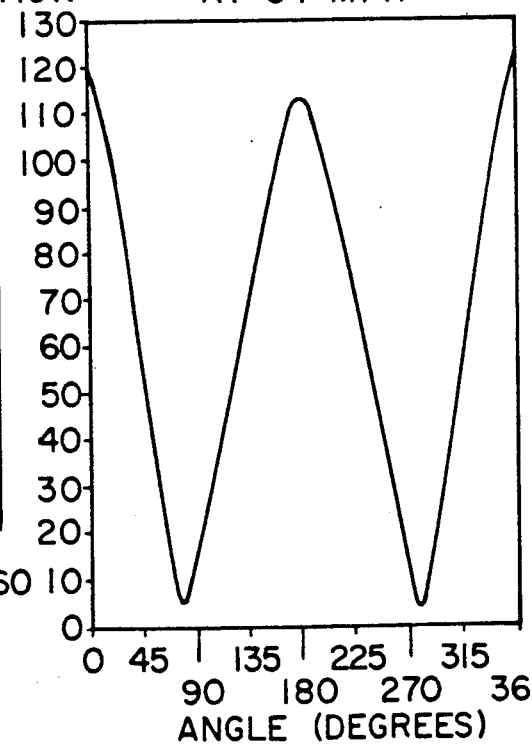

As illustrated in FIGS. 3, 3C and 5, the wind propeller 50 is formed with symmetrical blades 52 mounted at 45° on the propeller hub 54 so that the propeller responds equally or symmetrically to wind from either direction. Furthermore, because the propeller blades 52 are displaced from the center of the propeller by the hub 54, differential interference in the wind flow by the central stator and rotor is avoided.

In the example of FIG. 3, the electrical configuration of the stator consists of three stator coils spaced radially around the core at 120° angle intervals. The stator coils are electrically coupled in a delta configuration as illustrated by either the left hand or right hand delta coupling in FIG. 4. FIG. 4 shows the electrical circuit coupling from both the first and second pulse signal generators 12 and 14 of FIG. 1.

Figure 4A:
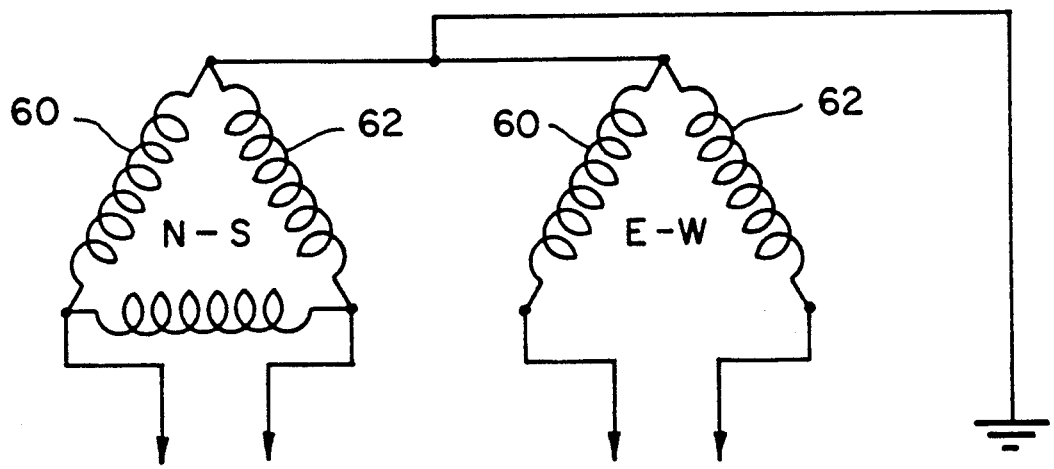
FIGS. 4A and 4B are simplified schematic circuit diagrams of alternative circuit couplings for the stator coils.
Figure 4B:
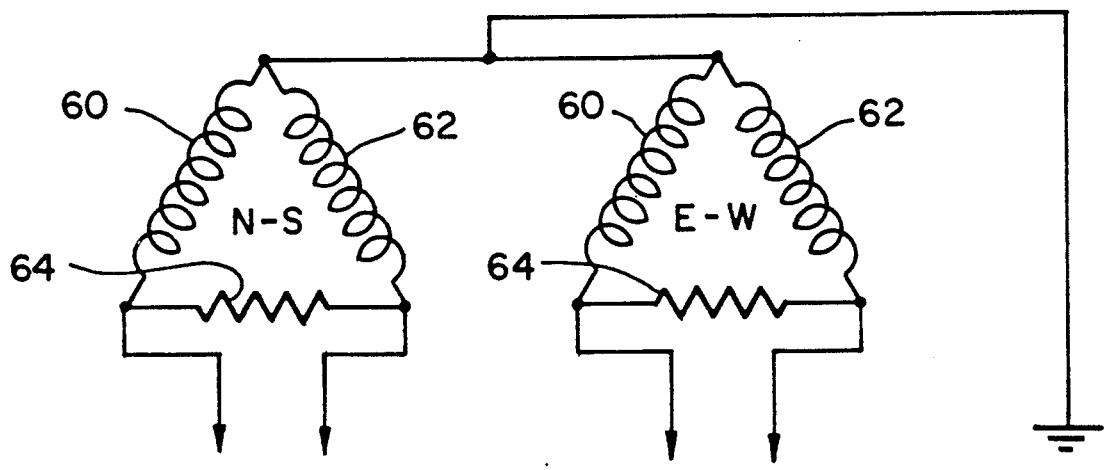

Alternatively the stator may consist of only two stator coils 60 and 62 coupled in an electrical circuit coupling as illustrated in FIG. 4A. The two stator coils are still spaced from each other at a phase detectable angular interval or radial angle interval in the direction of rotation of the rotor. As a further alternative, a resistor 64 may be coupled between the coil 60 and 62 as illustrated in FIG. 4B. Additional coils on the stator and additional poles on the rotor may also be provided to increase the number of pulses and effective pulse frequency for the pulse counts hereafter described. The pulse counts provide a measure of the magnitude of wind speed components and the increased number of pulses may be used to increase the resolution of the wind speed measurement.

The dynamic characteristics of the propellers 50 illustrated in FIGS. 3, 3C and 5 mounted on the pulse signal generators 12 and 14 of FIGS. 1, 2, and 3 are empirically determined and illustrated in the graphs of FIGS. 6A-6D. The graphs of FIGS. 6A-6D show the characteristic frequency of rotation of the propeller 50 in cycles per second (Hz) for different angles of incidence of the wind from 0° to 360° and at different wind speeds of 15 miles per hour, 30 miles per hour, 45 miles per hour, and 64 miles per hour.

From these characteristic curves of FIGS. 6A-6D, the calibration factors are derived for final determination of desired wind speed information as hereafter described. In the graphs of FIGS. 6A-6D, consider the frequency axis to be the Y-axis. This is also referred to as the "counts" axis as frequency also represents the "count" of pulses for a defined time interval. Consider the "angle" axis to be the X-axis representing the angle of the wind or wind angle with respect to the north-south direction in the N-S quadrant. Thus, the angle axis or X-axis indicates the wind angle within the N-E quadrant with respect to the N-S direction. The graphs of FIGS. 6A-6D are then "stacked" to form a third wind speed axis or Z-axis in three dimensions. To derive the calibration factors lines are drawn joining the points of equal angle on the characteristic curves stacked in the Z-axis direction. Lines are drawn at the 10° intervals of resolution for the system. These lines are then projected on the Counts/Speed or Y-Z plane. The slope "m" of the respective lines projected in the Y-Z plane are calculated and stored for example in a look-up table memory of the microprocessor hereafter described. The Y Axis intercept "b" or counts axis intercept for each line where wind speed is zero (Z=0) is also determined and stored in the look-up table memory of the microprocessor for each 10° interval. This calibration factor data for the pulse signal generator and wind propeller illustrated in FIGS. 1-5 is summarized in TABLE I.

TABLE I

| Wind Direction Angle "θ" with respect to N-S Direction for N-E Quadrant (X-Axis) | Slope "m" of Equal Angle Lines Projected on Counts/Speed (Y-Z) Plane | Intercept "b" On the Counts Axis (Y-axis) of Equal Angle Lines for Speed Zero (Z = 0) |
|---|---|---|
| 0° | 1.91 | −1.69 |
| 10° | 1.77 | −1.02 |
| 20° | 1.61 | −0.75 |
| 30° | 1.36 | −0.13 |
| 40° | 1.05 | +0.81 |
| 50° | .83 | +0.51 |
| 60° | .99 | +0.56 |
| 70° | .19 | +1.10 |
| 80° | .08 | −0.65 |
| 90° | 0. | 0. |

The use of the calibration factors from the look-up table represented by TABLE I for calculating the calibrated wind speed component magnitude signals according to the program steps hereafter described is as follows. The uncalibrated count signal for the wind speed component in the N-S direction is designated N. The uncalibrated count signal for the wind speed component in the E-W direction is designated E. The calibrated wind speed component magnitude signals for particular wind angles θ with respect to the wind propeller direction are designated F (θ) and are calculated according to the following equations:

$$F_N(\theta) = m*N + b$$

$$F_E(\theta) = m*E + b$$

The calibrated wind speed component magnitude signals $F_N(\theta)$ and $F_E(\theta)$ are incorporated in the programs steps for processing the wind speed and wind direction information as hereafter described.

Figure 7:
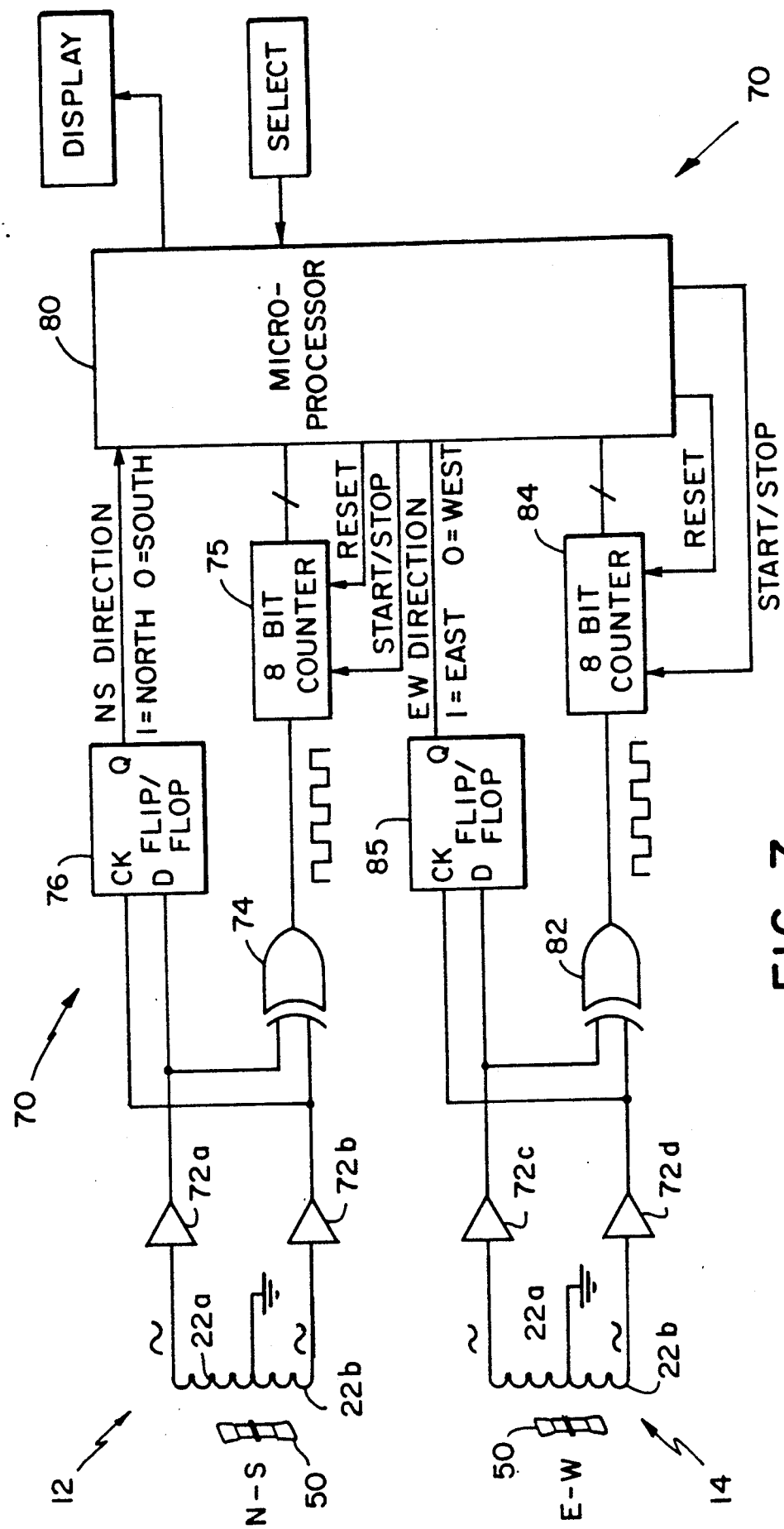
FIG. 7 is a system block diagram of the system for generating, storing, updating and displaying desired wind speed and wind direction information.

A system block diagram for full operation of the wind speed and wind direction pulse generator using the signal pulse generators 12 and 14 shown in the configuration of FIGS. 1 and 2, is illustrated in FIG. 7. In this example one of the pulse signal generators 12 and accompanying propeller 50 is designated the north-south (N-S) pulse signal generator while the other pulse signal generator 14 and accompanying propeller 50 is designated the east-west (E-W) pulse signal generator. Upon rotation of the respective propellers 50 and rotors 30, the rotating permanent magnet poles excite pulse signals in the stator coils 22a and 22b and corresponding stationary output lines which lead through the respective support tube 26 to the mast and accompanying electronic circuitry 70 hereafter described.

The pulses of the respective pulse signals are first formed or shaped into square wave pulses by operational amplifiers or op amps 72 individually designated 72a, 72b, 72c and 72d to facilitate subsequent processing. The pair of pulse signals from pulse signal generator 12 shaped by op amp 72a and 72b are input to exclusive OR gate 74 which effectively multiplexes or interleaves the phase shifted pulses of the pair of pulse signals into a single substantially square wave pulse signal at the input to a first counter 75. The counter 75 counts the number of pulses over a defined time interval, in this example two seconds, under the control of a microprocessor 80, and generates the first wind speed component magnitude signal N. The total count is proportional to the frequency which is in turn proportional to the component of wind speed in the north-south direction or along the north-south axis of the coordinate system and provides a proportional measure of the magnitude of the wind speed component in the north-south direction.

The pulse signals of the pair from pulse signal generator 12, shaped into substantially square wave pulses by op amps 72a and 72b, are also input to the phase detector 76 provided by a D type flip-flop. According to the direction of rotation of the propeller 50 of the pulse signal generator 12, the pulse signal from op amp 72a, which is phase shifted relative to the pulse signal from op amp 72b, either leads or lags in the phase shift. This direction of phase shift is detected by the phase detector flip-flop 76 which provides a signal "1" for a wind speed component from the north direction or a signal "0" for a wind speed component from the south direction. This phase shift direction signal NS is used by microprocessor 80 in determining the quadrant of origin of the wind for the compass coordinate system as hereafter described.

Similarly, the pulse signals of the pair of pulse signals generated by the second pulse signal generator 14 are shaped into substantially square wave pulses by op amps 72c and 72d. These shaped pulse signals provide the inputs to exclusive OR gate 82 which similarly multiplexes and interleaves the signals to provide a single pulse signal to the counter 84. Counter 84 counts the pulses over the predetermined time interval of two seconds under control of microprocessor 80 providing a second wind speed component magnitude signal E for the east-west component along the east-west axis of the coordinate system.

The same pulse signals from the pair of pulse signals shaped by op amps 72c and 72d are input to the second phase detector 85 similarly provided by a D-type flip-flop. The phase detector 85 determines the direction of phase shift between the pulse signals from op amps 72c and 72d and provides a signal "1" in the case of a wind speed component from the east direction and a signal "0" for a wind speed component from the west direction. This second phase shift direction signal EW is similarly stored by the microprocessor 80 for quadrant determination.

Figure 8:
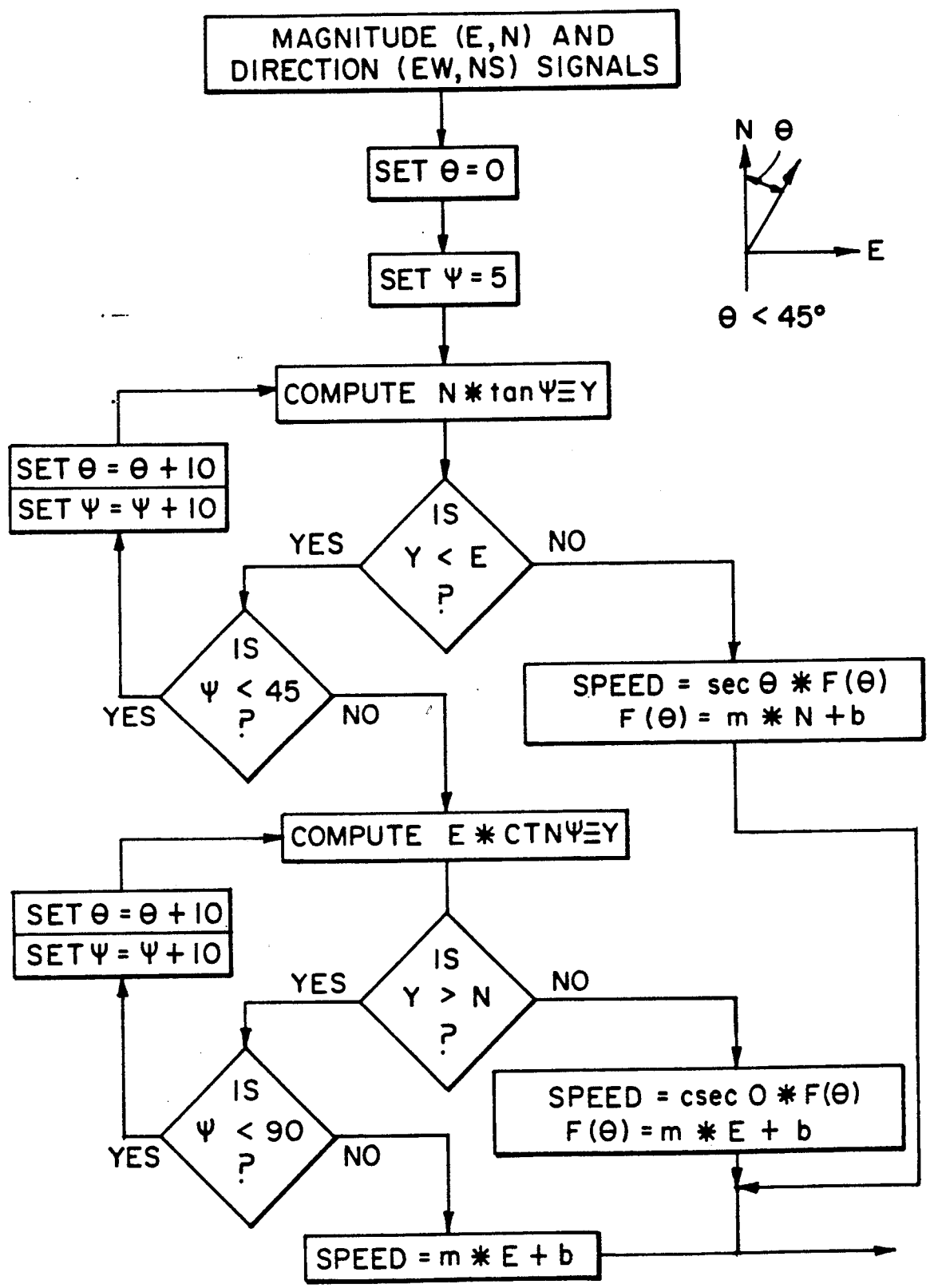
FIG. 8 is a flow chart of the system program software for determining the wind direction angle within the quadrant using the first and second wind speed magnitude signals and generating a wind direction angle signal, and for determining the magnitude of the wind speed at the wind direction angle using the wind direction angle signal and one of the wind speed component magnitude signals.
Figure 9:
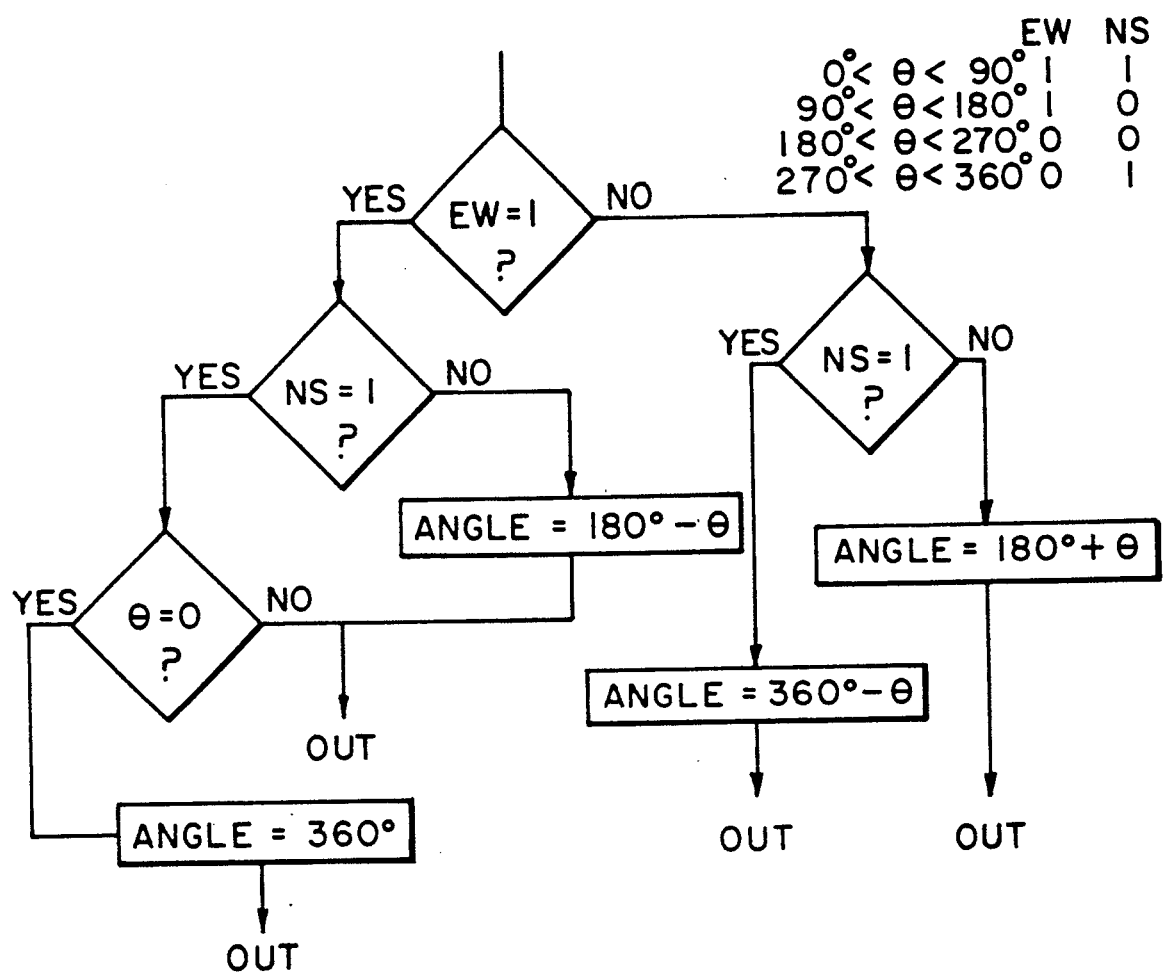
FIG. 9 is a flow chart of the system software for determining from the phase shift direction signals the quadrant of the compass coordinate system which coincides with the wind direction at the wind direction angle within the quadrant, generating a quadrant signal, and computing the desired wind direction information from the quadrant signal and wind direction angle signal.

Associated with microprocessor 80 is program software stored in EPROM chips which provide the coded instructions necessary for computing the desired wind speed and wind direction information from the wind speed component magnitude signals N and E and the phase shift direction signals NS and EW. The flow charts for this software are illustrated in FIGS. 8 and 9. For purposes of understanding the flow chart of FIG. 8 it is noted that the operating quadrant of the first and second pulse signal generators is selected to be the north-east (N-E) quadrant of a compass coordinate system although any 90° sector of a circle coordinate system may be selected. For the north-east operating quadrant, the wind speed component magnitude count from the north-south pulse signal generator 12 is designated "N" while the wind speed component magnitude count from the east-west pulse signal generator 14 is designated "E". FIG. 8 sets forth the flow chart for determining the wind direction angle within the north-east starting or operating quadrant (N-E) followed by determining the magnitude of the wind speed at the wind speed angle within the quadrant. To this end a novel algorithm for wind direction angle determination within the starting quadrant is set forth with the wind angle determination ascertained and specified at 10° intervals.

As shown in the flow chart of FIG. 8, the microprocessor initially receives the wind speed component magnitude counts respectively designated N and E from the first pulse signal generator oriented in the north-south direction and the second pulse signal generator oriented east-west direction. These count magnitude signals N and E are input to the microprocessor 80 directly from the counters 75 and 84 of FIG. 7. At the same time the microprocessor 80 also receives the phase shift direction signals NS and EW respectively from the first pulse signal generator 12 oriented in the north-south direction and the second pulse signal generator 14 oriented in the east-west direction. The phase shift direction signals NS and EW which may have a value of 1 or 0 according to the direction of the wind are input to the microprocessor 80 directly from the phase detectors 76 and 85 of FIG. 7.

According to the algorithm for determining the wind direction angle within the quadrant, the magnitude count for one of the wind speed components for example the count magnitude E are predicted from the counted magnitude of the other wind speed component for example count magnitude N, for selected angle intervals through the quadrant. For 10° intervals beginning with $\theta = 0°$, the predicted magnitude counts are computed at the midpoint angle $\psi = 5°$ for the first interval or generally $\psi = \theta + 5°$ for subsequent intervals. As shown in the flow chart for the first interval $\theta$ is set $=0°$ and $\psi$ is set $=5°$.

The predicted magnitude counts for the wind speed component in the east-west direction are designated Y and the predicted value for the interval $Y = N * TAN \psi$. If the predicted value Y is less than E and $\psi$ is less than 45° then the predicted value is computed for the next interval by incrementing the starting angle $\theta$ to the beginning of the second interval where $\theta = 10°$ and incrementing the midpoint angle $\psi$ to $\theta + 5°$ or 15°. The predicted value Y for the midpoint of the second interval is then computed and again compared with the actual count magnitude E until the comparison identifies the Y=E or slightly greater than E.

For wind direction angles greater than 45° within the quadrant the role of the respective wind speed component magnitude counts N and E are reversed and the cotangent function CTN is used to compute the predicted values Y at successive 10° intervals for comparison with the actual measured wind speed component magnitude counts.

Upon ascertaining the wind direction angle within the starting or operating quadrant and generating respective wind direction angle signals, the magnitude of the wind speed at the wind direction angle is determined using one of the actual wind speed component magnitude counts N or E and a secant (SEC) or cosecant (CSEC) function signal for the wind direction angle all as set forth in the flow chart of FIG. 8. The wind speed component magnitude signal is first calibrated to provide the calibrated wind speed component magnitude signal $F(\theta)$ for the particular wind direction angle from the empirically derived calibration factors characteristic of the propellers and summarized in the graphs of FIGS. 6A–6D and TABLE I as heretofore described. The calibration factors are summarized in Table I. The SEC $\theta$ or CSC $\theta$ function signal is multiplied time the calibrated wind speed component magnitude signal $F(\theta)$ to give the true wind speed.

Determination of the quadrant of origin of the true wind direction is determined from the phase shift direction signals ND and ED as shown in the flow chart of FIG. 9. The logical conditions for selection of the correct quadrant are summarized in Table 2. As further shown in the flow chart of FIG. 9 once the correct quadrant of wind origin is selected along with the angle data within the quadrant, the true direction angle of the wind within the full compass coordinate system is established as follows. For the first quadrant between north and east the true angle of origin of the wind is $=\theta$. For the second quadrant between east and south the true wind angle is $180° - \theta$. For the third quadrant between south and west the true wind angle is $180° + \theta$ while for the fourth quadrant the final wind angle is $360° - \theta$.

TABLE II

|  | N |  |
|---|---|---|
| W | NS = 1<br>EW = 0<br>270° < $\theta$ < 360° (1,0) | NS = 1<br>EW = 1<br>0 < $\theta$ < 90° (1,1) | E
| | NS = 0<br>EW = 0<br>180° < $\theta$ < 270° (0,0) | NS = 0<br>EW = 1<br>90° < $\theta$ < 180° (0,1) |
|  | S |  |

The desired wind direction and wind speed information is stored by the microprocessor 80. The clock of the microprocessor is set to sample the counters 75 and 84 and phase detectors 76 and 85 every two seconds for updating the wind direction and wind speed information. Parameters may be selected for display for example as set forth in U.S. Pat. No. 4,287,762 and in U.S. patent application Ser. No. 268,802 filed Nov. 7, 1988. While the invention has been described with reference to particular example embodiments it is intended to cover all modifications and equivalents within the scope of the following claims.

We claim:

1. A wind speed and wind direction signal generator for generating desired wind speed and wind direction information comprising:

first signal generating means having a first wind propeller oriented at a first compass angle for generating in response to the wind a first wind speed component magnitude signal having a signal parameter substantially proportional to the magnitude of a first wind speed component at said first compass angle;

second signal generating means having a second wind propeller oriented at a second compass angle for generating in response to the wind a second wind speed component magnitude signal having a signal parameter substantially proportional to the magnitude of a second wind speed component at a second compass angle;

said second compass angle being approximately 90° from the first compass angle for defining a quadrant of a compass coordinate system;

rotation direction detector means for detecting direction of rotation of said first and second wind propellers and for generating first and second rotation direction signals;

computer processor means operatively coupled to receive the first and second wind speed component magnitude signals and said first and second rotation direction signals;

and program means associated with said computer processor means comprising coded instructions for: determining the wind direction angle within said quadrant using the first and second wind speed component magnitude signals and generating a wind direction angle signal; determining the magnitude of the wind speed at said wind direction angle using the wind direction angle signal and one of said wind speed component magnitude signals and generating the desired wind speed information; determining from said first and second rotation direction signals the quadrant of the compass coordinate system in which the wind direction coincides with said wind direction angle of the quadrant and generating a quadrant signal; and generating the desired wind direction information from the quadrant signal and wind direction angle signal.

2. The wind speed and wind direction signal generator of claim 1 wherein the first and second signal generating means comprise respectively first and second pulse generating means for generating in response to the wind first and second pulse signals having respective pulse frequencies substantially proportional to the magnitudes of the first and second wind speed components at said first and second compass angles.

3. The wind speed and wind direction signal generator of claim 2 further comprising first and second counter means respectively coupled to the first and second pulse generating means for counting pulses of the first and second pulse signal means through a defined time interval and generating said first and second wind speed component magnitude signals.

4. The wind speed and wind direction signal generator of claim 2 wherein each of the first and second pulse generating means is constructed and arranged to generate pulse signal means comprising a pair of pulse signals phase shifted relative to each other with the relative direction of the phase shift determined by the direction of rotation of the respective wind propeller.

5. The wind speed and wind direction signal generator of claim 4 wherein the rotation direction detector means comprises:

first phase detector means coupled to the first pulse generating means for detecting the relative direction of phase shift of a first pair of pulse signals and for generating a first phase shift direction signal forming said first rotation direction signal;

second phase detector means coupled to the second pulse generating means for detecting the relative direction of phase shift of a second pair of pulse signals and for generating a second phase shift direction signal forming said second rotation direction signal;

said computer processor being operatively coupled to the first and second phase detector means, and said program means comprising code instructions for determining from said first and second phase shift direction signals forming the first and second rotation direction signals, the quadrant of the compass coordinate system in which the wind direction coincides with said wind direction angle of the quadrant and generating a quadrant signal.

6. The wind speed and wind direction signal generator of claim 1 comprising display means coupled to the computer processor means and wherein the program means comprises coded instructions for storing, updating, and displaying the desired wind speed and wind direction information.

7. The wind speed and wind direction signal generator of claim 1 wherein the program means further comprises coded instructions for determining the wind direction angle within said quadrant by: predicting magnitudes of one of the wind speed components from the magnitude of the other wind speed component by providing tangent or cotangent trigonometric ratio signals for successive angles within said quadrant, using the other wind speed magnitude signal and said tangent or cotangent trigonometric ratio signals, and generating corresponding predicted magnitude signals for said successive angles within the quadrant; comparing the predicted magnitudes at the successive angles for said one wind speed component with the magnitude of said one wind speed component using said corresponding predicted magnitude signals and wind speed component magnitude signal; and ascertaining from said comparisons the approximate wind direction angle within said quadrant and generating the wind direction angle signal.

8. The wind speed and wind direction signal generator of claim 7 wherein the program means further comprises coded instructions for determining the magnitude of the wind speed at said wind direction angle by: providing a secant or cosecant trigonometric ratio signal in response to the wind direction angle signal for the respective wind direction angle; generating a function signal as a function of one of the wind speed component magnitude signals and the wind direction angle signal; multiplying the function signal with the secant or cosecant trigonometric ratio signal for said wind direction angle; and generating the desired speed information.

9. The wind speed and wind direction signal generator of claim 8 wherein the program means further comprises coded instructions for: generating for the function signal a calibration function signal characteristic of the method of generating the respective first and second pulse signal means.

10. An automated method for determining desired wind speed and wind information comprising:

generating in response to the wind using a first wind propeller a first wind speed component magnitude signal having a signal parameter substantially proportional to the magnitude of a first wind speed component at a first compass angle;

generating in response to the wind using a second wind speed propeller a second wind speed component magnitude signal having a signal parameter substantially proportional to the magnitude of a second wind speed component at a second compass angle approximately 90° from the first compass angle, said first and second compass angles defining a quadrant of a compass coordinate system;

detecting the direction of rotation of the respective first and second wind propellers and generating first and second rotation direction signals;

determining the wind direction angle within said quadrant using the first and second wind speed component magnitude signals and generating a wind direction angle signal;

determining the magnitude of the wind speed at said wind direction angle using the wind direction angle signal and one of said wind speed component magnitude signals, and generating the desired wind speed information;

determining the quadrant of the compass coordinate system in which the wind direction coincides with said wind direction angle of within the quadrant using the first and second rotation direction signals, generating a quadrant signal, and generating the desired wind direction information using said quadrant signal and the wind direction angle signal.

11. A wind speed and wind direction signal generator for generating desired wind speed and wind direction information comprising:

first pulse generating means for generating in response to the wind a first pulse signal means having a pulse frequency substantially proportional to the magnitude of a first wind speed component at a first compass angle;

second pulse generating means for generating in response to the wind a second pulse signal means having a pulse frequency substantially proportional to the magnitude of a second wind speed component at a second compass angle approximately 90° from the first compass angle, said first and second compass angles defining a quadrant of a compass coordinate system;

first counter means operatively coupled to the first pulse generating means for counting pulses of the first pulse signal means through a defined time interval and generating a first wind speed component magnitude signal;

second counter means operatively coupled to the second pulse generating means for counting pulses of the second pulse signal means through said defined time interval and generating a second wind speed component magnitude signal;

computer processor means operatively coupled to the first and second counter means;

and program means associated with said computer processor means comprising coded instructions for: determining the wind direction angle within said quadrant using said first and second wind speed component magnitude signals and generating a wind direction angle signal; determining the magnitude of the wind speed at said wind direction angle using the wind direction angle signal and one of said wind speed component magnitude signals; and generating the desired wind speed information.

12. The wind speed and wind direction signal generator of claim 11 wherein each of the first and second pulse generating means is constructed and arranged to generate pulse signal means comprising a pair of pulse signals phase shifted relative to each other with the relative direction of the phase shift determined by the direction of the respective wind speed component, and further comprising:

first phase detector means coupled to the first pulse generating means for detecting the relative direction of phase shift of a first pair of pulse signals and for generating a first phase shift direction signal;

second phase detector means coupled to the second pulse generating means for detecting the relative direction of phase shift of a second pair of pulse signals and for generating a second phase shift direction signal;

said computer processor being operatively coupled to the first and second phase detector means;

and said program means further comprising coded instructions for: determining from said phase shift direction signals the quadrant of the compass coordinate system in which the wind direction coincides with said wind direction angle of the quadrant, and generating a quadrant signal; and generating the desired wind direction information from the quadrant signal and wind direction angle signal.

13. The wind speed and wind direction signal generator of claim 12 comprising display means coupled to the computer processor means and wherein the program means comprises coded instructions for storing, updating, and displaying desired wind speed and wind direction information.

14. The wind speed and wind direction signal generator of claim 12 wherein each of the first and second pulse generating means comprises:

a stator having at least two stator coils providing respective first and second stationary output lines for delivering said pair of pulse signals on the stationary output lines, said stator coils being mounted on the stator at an angle relative to each other in the direction of rotation of a rotor so that the pulse signals of the pair are phase shifted relative to each other at a phase detectable angle;

a rotor having at least one permanent magnet providing two poles spaced from each other and mounted on the rotor for rotation relative to the respective stator coils for exciting pulse signals on the stationary output lines of the stator coils upon rotation of the rotor;

a wind propeller mounted on and secured to the rotor for causing rotation of the respective rotor in response to wind, said propeller being oriented for facing one of the first or second compass angles and being constructed and arranged for rotation at a frequency substantially proportional to the magnitude of the wind speed component at the respective compass angle.

15. The wind speed and wind direction signal generator of claim 14 comprising exclusive OR gate means operatively coupled between the stationary output lines of the stator coils of each of the first and second pulse generating means and the respective first or second counter means for multiplexing and counting the pulses from both pulse signals of the pair of pulse signals of the respective pulse generating means for improving resolution of the magnitude of the respective wind speed component magnitude signal.

16. The wind speed and wind direction signal generator of claim 15 further comprising operational amplifier means operatively coupled between the respective first and second pulse generating means and the respective first and second phase detector means and exclusive OR gate means for squaring the pulses of the respective pairs of pulse signals to facilitate phase detection and counting.

17. The wind speed and wind direction signal generator of claim 12 wherein the program means further comprises coded instructions for determining the wind direction angle within said quadrant by: predicting magnitudes of one of the wind speed components from the magnitude of the other wind speed component by providing tangent or cotangent trigonometric ratio signals for successive angles within said quadrant, using the other wind speed magnitude signal and said tangent or cotangent trigonometric ratio signals, and generating corresponding predicted magnitude signals for said successive angles within the quadrant; comparing the predicted magnitudes at the successive angles for said one wind speed component with the actual magnitude of said one wind speed component by using and comparing said corresponding predicted magnitude signals with the wind speed component magnitude signal; and ascertaining from said comparisons the approximate wind direction angle within said quadrant and generating the wind direction angle signal.

18. The wind speed and wind direction signal generator of claim 17 wherein the program means further comprises coded instructions for determining the magnitude of the wind speed at said wind direction angle by: providing a secant or cosecant trigonometric ratio signal in response to the wind direction angle signal for the respective wind direction angle; calibrating one of the wind speed component magnitude signals according to a calibrating function of the wind direction angle within the quadrant characteristic of the respective pulse generating means; multiplying the calibrated wind speed component magnitude signal with the secant or cosecant trigonometric ratio signal for said wind direction angle; and generating the desired wind speed information.

19. The wind speed and wind direction signal generator of claim 18 wherein the program means further comprises coded instructions for: looking up calibration factor slope and intercept signals characteristic of the pulse generating means which generate the respective first and second pulse signal means for the particular wind direction angle; and calculating the calibrated wind speed component magnitude signal by said calibration factor slope and intercept signals for generating the desired wind speed information.

20. An automated method for determining desired wind speed and wind direction information comprising:
generating in response to the wind, first pulse signal means having a pulse frequency substantially proportional to the magnitude of a first wind speed component at a first compass angle;
generating in response to the wind, second pulse signal means having a pulse frequency proportional to the magnitude of a second wind speed component at a second compass angle approximately 90 degrees from the first compass angle, said first and second compass angles defining a quadrant of a compass coordinate system;
measuring the magnitude of the first wind speed component by counting pulses of the first pulse signal means through a defined time interval and generating a first wind speed component magnitude signal;
measuring the magnitude of the second wind speed component by counting pulses of the second pulse signal means through a similar defined time interval and generating a second wind speed component magnitude signal;
determining the wind direction angle within said quadrant using said first and second wind speed component magnitude signals and generating a wind direction angle signal;
and determining the magnitude of the wind speed at said wind direction angle using the wind direction angle signal and one of said wind speed component magnitude signals, and generating the desired wind speed information.

21. The method of claim 20 comprising the step of determining the quadrant of the compass coordinate system in which the wind direction coincides with said wind direction angle within the quadrant, generating a quadrant signal, and generating the desired wind direction information from said quadrant signal and wind direction angle signal.

22. The method of claim 21 wherein the step of generating each of the first and second pulse signal means in response to the wind comprises generating a pair of pulse signals phase shifted relative to each other with the direction of the phase shift determined by the respective wind speed component direction, and further comprising the steps of:
detecting the relative direction of the phase shift of each of the pair of pulse signals comprising the respective first and second pulse signal means and generating first and second phase shift direction signals;
determining from said first and second phase shift direction signals the quadrant of the compass coordinate system in which the wind direction coincides with said wind direction angle of the quadrant and generating a quadrant signal;
and generating the desired wind direction information from the quadrant signal and wind direction angle signal.

23. The method of claim 21 including the steps of storing, updating, and displaying current desired wind speed and wind direction information.

24. The method of claim 23 including the steps of identifying, storing, updating and displaying maximum wind speed information and corresponding wind direction and date of occurrence information for a selected time period.

25. The method of claim 22 wherein the step of generating each of the first and second pulse signal means comprises:
directing a propeller at the respective first or second compass angle;
rotating a rotor coupled to the propeller in response to the wind, said rotor comprising at least spaced apart north and south magnetic poles mounted for rotation on the rotor;
maintaining a pair of stator coils at an angle with respect to each other in the direction of rotation of the rotor and in relation to the rotor for excitation of the pair of coils by the magnetic poles upon rotation of the rotor, thereby generating the phase shifted pair of pulse signals on stationary output lines from the respective stator coils.

26. The method of claim 25 wherein the step of counting pulses for each of the respective first and second pulse signal means comprises counting pulses from both the phase shifted pulse signals of the pair of pulse signals on the stationary output lines of the stator coils for increased resolution of the wind speed component magnitude signals.

27. The method of claim 20 wherein the step of determining the wind direction angle within said quadrant from the said first and second wind speed component magnitude signals comprises:

predicting magnitudes of one of the wind speed components from the measured magnitude of the other wind speed component by providing tangent or cotangent trigonometric ratio signals for successive angles within said quadrant, using the other wind speed magnitude signal and said tangent or cotangent trigonometric ratio signals, and generating corresponding predicted magnitude signals for said one of the wind speed components at the successive angles within said quadrant;

comparing the predicted magnitudes at the successive angles for said one of the wind speed components with the measured magnitude of said one of the wind speed components using said corresponding predicted magnitude signals and wind speed component magnitude signal for said one of the wind speed components;

and ascertaining from said comparisons the approximate wind direction angle within said quadrant, and generating the wind direction angle signal.

28. A method of claim 27 wherein the step of determining the magnitude of the wind speed at said ascertained wind direction angle comprises:

providing a secant or cosecant trigonometric ratio signal in response to the wind direction angle signal for the respective wind direction angle;

calibrating the wind speed component magnitude signals according to a calibrating function of the wind direction angle within the quadrant characteristic of the respective pulse generating means;

multiplying one of the calibrated wind speed component magnitude signals with the secant or cosecant trigonometric ratio signal for said wind direction angle;

and generating a wind speed magnitude signal.

29. The method of claim 28 comprising the steps of:
generating calibration-factor slope and intercept signals characteristic of the pulse generating means which generate the respective first and second pulse signal means;

and calculating the calibrated wind speed component magnitude signal using the calibration factor slope and intercept signals.

30. The method of claim 25 comprising the steps of:
determining and generating calibration factor signals for the respective propellers according to the characteristic propeller response to the wind;

and determining the magnitude of the wind speed using the wind direction angle signal, one of said wind speed component magnitude signals, and the calibration factor signals.

31. The method of claim 30 wherein the step of determining the magnitude of the wind speed comprises:

providing a secant or cosecant trigonometric ratio signal in response to the wind direction angle signal for the respective wind direction angle;

and multiplying the secant or cosecant trigonometric ratio signal and a calibrated wind speed component magnitude signals to generate the desired wind speed information.

32. A wind speed and wind direction signal generator comprising:

first and second pulse signal generators each comprising a respective stator and rotor;

the stator of each pulse generator having at least two stator coils providing respective first and second stationary output lines for delivering a pair of pulse signals on said stationary output lines, said stator coils being mounted at an angle relative to each other in the direction of rotation of a rotor so that the pulse signals of the pair are phase shifted relative to each other at a phase detectable angle;

the rotor of each pulse signal generator having at least one permanent magnet providing two poles spaced from each other and mounted on the rotor for rotation relative to the respective stator coils for exciting pulse signals on the stationary output lines of the stator coils upon rotation of the rotor;

first and second wind propellers mounted respectively on the rotors and secured to said respective rotors of the first and second pulse signal generators, said wind propellers being mounted and oriented in compass directions at approximately 90° with respect to each other encompassing a quadrant of a compass coordinate system for causing rotation of the respective rotors in response to wind and at respective frequencies substantially proportional to first and second wind speed components at approximately 90° with respect to each other thereby generating wind speed component pulse signals on the stationary output lines of the stator coil;

first and second phase detector means coupled to the stationary output lines of the stator coils of the respective first and second pulse signal generators, each phase detector being coupled for detecting the relative direction of phase shift of the pulse signals of the pair of pulse signals from the respective pulse signal generator and delivering a phase shift direction signal, said first and second phase detector means thereby generating first and second phase shift direction signals for the respective first and second pulse signal generators;

first and second counters coupled respectively to at least one stationary output line from the stator coils of the respective first and second pulse signal generators for counting pulses from the respective first and second pulse signal generators over a selected time interval and providing first and second count signals proportional to the respective magnitudes of the first and second wind speed components;

microprocessor means operatively coupled to receive the first and second phase shift direction signals and the first and second count signals, said microprocessor comprising computer program means having coded instructions directing the microprocessor for: determining the wind speed direction angle between the first and second compass direction angles of the quadrant from the first and second count signals and generating a wind speed direction angle signal; calculating the magnitude of the wind speed at said wind speed direction angle using one of the first and second count signals and said wind speed direction angle signal; determining the quadrant of the compass coinciding with the wind direction from said first and second phase shift direction signals; and generating and storing the desired wind speed and wind direction information.

33. The wind speed and wind direction signal generator of claim 32 wherein the program means further comprises coded instructions for determining the wind direction angle within said quadrant by: predicting magnitudes of one of the wind speed components from the counted magnitude of the other wind speed component by providing tangent or cotangent trigonometric ratio signals for successive angles within said quadrant, using the other wind speed magnitude signal and said tangent or cotangent trigonometric ratio signals, and generating corresponding predicted magnitude signals for said successive angles within the quadrant; comparing the predicted magnitudes at the successive angles for said one wind speed component with the counted magnitude of said one wind speed component using said corresponding predicted magnitude signals and wind speed component magnitude signal; and ascertaining from said comparisons the approximate wind direction angle within said quadrant and generating the wind direction angle signal.

34. A wind speed and wind direction signal generator having at least one pulse signal generating means comprising:
- a stator having at least two stator coils providing respective first and second stationary output lines for delivering a pair of first and second pulse signals on the stationary output lines, said stator coils being mounted on the stator at an angle relative to each other in the direction of rotation of a rotor so that the first and second pulse signals of the pair are phase shifted relative to each other at a phase detectable angle;
- a rotor having at least one permanent magnet means providing at least two poles spaced from each other and mounted on the rotor for rotation relative to the respective stator coils for exciting pulse signals on the stationary output lines of the stator coils without commutators or brushes upon rotation of the rotor;
- said stator comprising an elongate axial support having the stator coils mounted at a first end, a second end of said elongate axial support being securable to stationary support means, and a mounting hub comprising a first cylindrical cup receiver secured to the elongate axial support between the respective first and second ends of the axial support, said mounting hub being constructed for receiving an end of the rotor within the first cylindrical cup receiver;
- said rotor comprising an elongate rotor sleeve housing constructed to fit over said first end of the elongate axial support of the stator, said rotor permanent magnet means being secured to the rotor sleeve housing at a first end for rotation adjacent to the stator coils, a second end of the rotor sleeve housing being received within the first cylindrical cup receiver of the stator mounting hub;
- a wind propeller mounted on and secured to the rotor for causing rotation of the rotor in response to wind, said propeller being oriented for facing a selected compass angle and being constructed for rotation at a frequency substantially proportional to the magnitude of the wind speed component at the respective compass angle.

35. A wind speed and wind direction signal generator comprising two pulse signal generating means as set forth in claim 34, the wind propellers of said two pulse signal generating means being oriented at approximately 90° with respect to each other and being secured in fixed positions defining a selected quadrant of a compass coordinate system.

36. The wind speed and wind direction signal generator of claim 35 wherein each wind propeller is formed to be substantially symmetrical in response to wind from opposite directions, said wind propellers comprising flat symmetrical blades mounted on a blade hub at 45° relative to an axis of rotation through the blade hub.

37. The wind speed and wind direction signal generator of claim 34 wherein the mounting hub of the stator and the second end of the rotor sleeve housing are formed with complementary mating surfaces for positioning adjacent to each other during rotation of the rotor relative to the stator to keep out dust and particles from the mounting hub.

38. The wind speed and wind direction signal generator of claim 37 wherein the stator is formed with a protective annular washer secured to the cylindrical cup receiver of the mounting hub and extending radially inward from the cylindrical cup receiver, said protective annular washer being formed with a central opening, and wherein the second end of the rotor sleeve housing is formed with an annular flange means complementary with the protective annular washer, said stator and rotor being constructed so that the annular flange means of the rotor and the protective annular washer of the stator are seated adjacent to each other during rotation of the rotor relative to the stator to protect the mounting hub from entry of dust and particles.

39. The wind speed and wind direction signal generator of claim 34 wherein the wind propeller is mounted adjacent to the second end of the rotor sleeve housing, and wherein the wind propeller is formed with a propeller hub in the configuration of a second cylindrical cup receiver, said rotor being constructed so that the first cylindrical cup receiver of the stator mounting hub is received within the propeller hub second cylindrical cup receiver of the wind propeller.

* * * * *